(12) United States Patent
Moschini et al.

(10) Patent No.: US 7,089,909 B2
(45) Date of Patent: Aug. 15, 2006

(54) CHOKE VALVE PROVIDED WITH AN INTEGRATED ELECTROMAGNETIC ACTUATOR FOR AN INTAKE MANIFOLD WITH A RETRACTING TUMBLE SYSTEM

(75) Inventors: Renzo Moschini, Bologna (IT); Nazario Bellato, Bologna (IT); Federico Lancioni, San Gemini (IT); Riccardo Nazzaro, Bologna (IT); Sandro Sirani, San Benedetto Val Di Sambro (IT)

(73) Assignee: Magneti Marelli Powertrain S.p.A., Corbetta (IT)

( * ) Notice: Subject to any disclaimer, the term of this patent is extended or adjusted under 35 U.S.C. 154(b) by 0 days.

(21) Appl. No.: 11/066,319

(22) Filed: Feb. 25, 2005

(65) Prior Publication Data

US 2005/0199214 A1    Sep. 15, 2005

(30) Foreign Application Priority Data

Feb. 27, 2004  (IT)  .......................... BO2004A0113

(51) Int. Cl.
*F02B 31/00*     (2006.01)
*F02B 31/08*     (2006.01)

(52) U.S. Cl. .................. 123/306; 123/184.56
(58) Field of Classification Search ................ 123/399, 123/336, 306, 308, 301, 302, 432, 184.56
See application file for complete search history.

(56) References Cited

U.S. PATENT DOCUMENTS

| | | | | |
|---|---|---|---|---|
| 4,577,602 A | * | 3/1986 | Showalter | 123/306 |
| 4,858,567 A | * | 8/1989 | Knapp | 123/184.56 |
| 5,311,848 A | * | 5/1994 | Isaka et al. | 123/188.14 |
| 5,850,816 A | * | 12/1998 | Ohsuga et al. | 123/430 |
| 6,199,534 B1 | * | 3/2001 | Tokuyasu et al. | 123/301 |
| 6,705,280 B1 | * | 3/2004 | Lippert | 123/306 |
| 2001/0023677 A1 | | 9/2001 | Fujieda et al. | |
| 2003/0150422 A1 | | 8/2003 | Huh | |
| 2005/0155570 A1 | * | 7/2005 | Confer et al. | 123/306 |

FOREIGN PATENT DOCUMENTS

| | | |
|---|---|---|
| DE | 297 09 028 U1 | 7/1997 |
| DE | 299 24 529 U1 | 8/2003 |

* cited by examiner

*Primary Examiner*—Mahmoud Gimie
(74) *Attorney, Agent, or Firm*—Jacobson Holman PLLC

(57) ABSTRACT

A choke valve for an intake manifold with a retracting tumble system for an engine provided with a number of cylinders, the choke valve being adapted to vary the passage section of the air through an intake duct which connects each cylinder with the intake manifold and is regulated by at least one intake valve; the choke valve comprises a butterfly mounted to rotate about an axis of rotation disposed transversely and externally with respect to the corresponding intake duct under the thrust of a corresponding rotary electric motor which comprises a stator and a rotor housed directly in the butterfly.

19 Claims, 3 Drawing Sheets

CHOKE VALVE PROVIDED WITH AN INTEGRATED ELECTROMAGNETIC ACTUATOR FOR AN INTAKE MANIFOLD WITH A RETRACTING TUMBLE SYSTEM

The present invention relates to a choke valve for an intake manifold with a retracting tumble system.

BACKGROUND OF THE INVENTION

An internal combustion engine is provided with a number of cylinders, each of which is connected to an intake manifold by means of a respective intake valve and to an exhaust manifold valve by means of a respective exhaust valve. The intake manifold receives fresh air (i.e. air from the external environment) via a supply duct regulated by a butterfly valve and is connected to the cylinders by means of respective intake ducts, each of which is regulated by a corresponding intake valve.

It has recently been proposed to introduce a tumble system which is adapted to vary, during operation of the engine, the section of the intake ducts as a function of the engine speed (i.e. the angular speed of rotation of the drive shaft). At low speeds, the passage section of the air through the intake ducts is decreased in order to generate turbulent movements in the suctioned flow of air and in the vicinity of the variation of section, which movements improve the mixing of the air and fuel in the cylinders; as a result of the presence of these turbulent movements which improve mixing, all the fuel injected is combusted with the result that the pollutant emissions generated by combustion are therefore reduced. At high speeds, the passage section of the air through the intake ducts is maximised in order to enable complete filling of the cylinders and thus to enable the generation of the maximum possible power.

In order to vary the passage section of the air through the intake ducts, it has been proposed to dispose a respective butterfly choke valve within each intake duct, which valve rotates about a shaft disposed at the centre of the relative intake duct. This solution is simple and economic to embody, but the presence of the butterfly choke valves in the middle of the intake ducts entails high losses of load in the flow of air when the tumble system is not active because the profile of the butterfly valves is completely immersed in the air flow; obviously, these losses of load reduce the maximum flow of air that can be taken in by the cylinders, thereby reducing the maximum power that can be generated.

To try to remedy the above-mentioned drawback, it has been proposed to provide each cylinder with two intake ducts which are independent from one another and only one of which is provided with a butterfly choke valve. This solution enables better filling of the cylinders at high speeds, but is nevertheless more costly and complex to embody, as two independent intake ducts are provided for each cylinder; moreover, the generation of the turbulent movements at low speeds is not optimal as, for each cylinder, one of the two intake ducts has no variation of section.

SUMMARY OF THE INVENTION

The object of the present invention is to provide a choke valve for an intake manifold with a retracting tumble system, which is free from the drawbacks described above and which is, in particular, easy and economic to produce.

The present invention therefore relates to a choke valve for an intake manifold with a retracting tumble system as set out in the attached claims.

The present invention further relates to an intake manifold with a retracting tumble system as set out in the attached claims.

BRIEF DESCRIPTION OF THE DRAWINGS

The present invention is described below with reference to the accompanying drawings, which show a non-limiting embodiment thereof, and in which.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
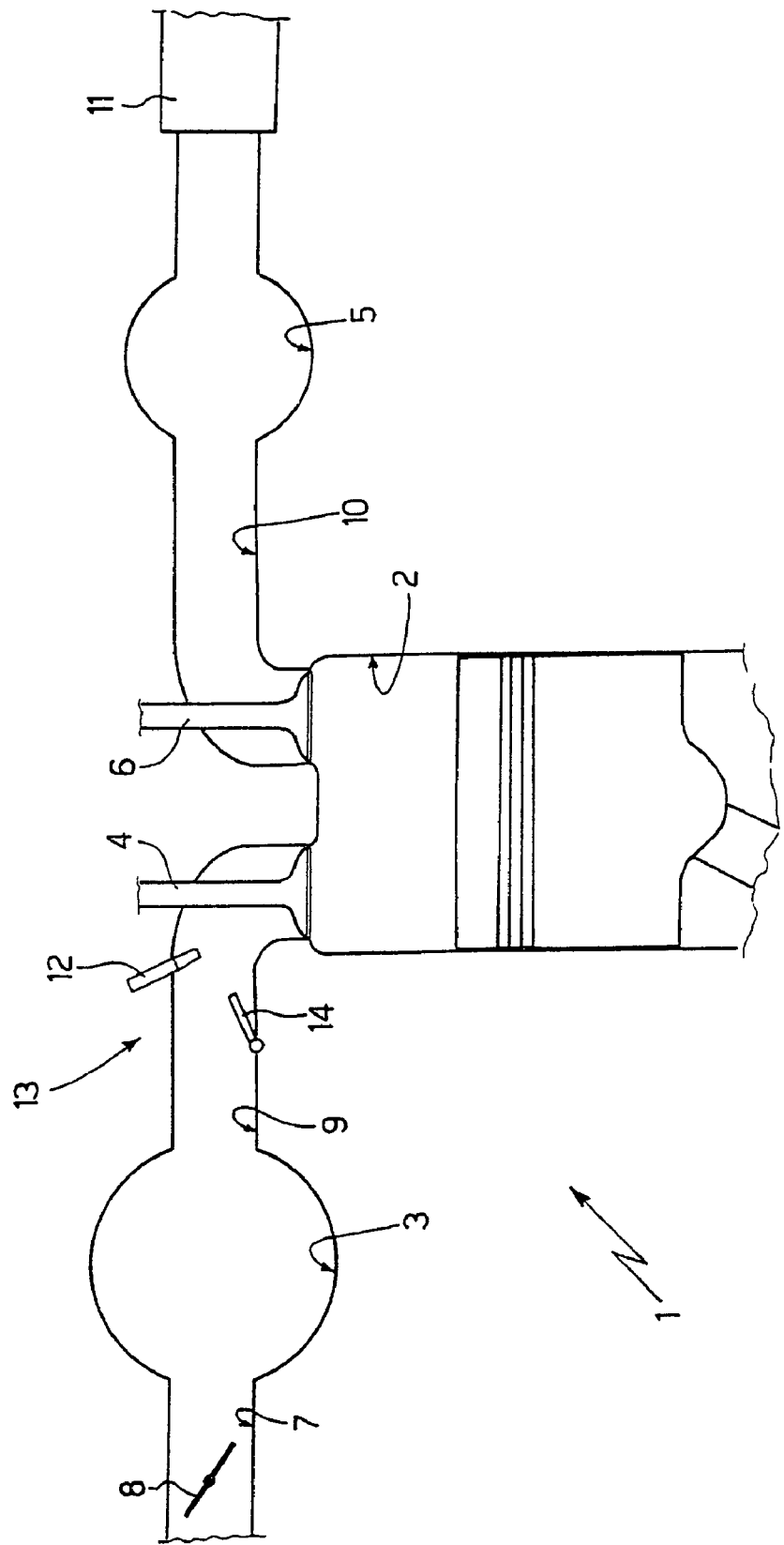
FIG. 1 is a diagrammatic view of an internal combustion engine provided with an intake manifold with a retracting tumble system, which uses the butterfly valves embodied in accordance with the present invention.

In FIG. 1, an internal combustion engine is shown overall by 1 and is provided with four cylinders 2 (only one of which is shown in FIG. 1), each of which is connected to an intake manifold 3 via a respective intake duct 4 and to an exhaust manifold 5 via a respective exhaust duct 6.

The intake manifold 3 receives fresh air (i.e. air from the external environment) via a supply duct 7 regulated by a butterfly valve 8 and is connected to the cylinders 2 by means of respective intake ducts 9 (only one of which is shown in FIG. 1), each of which is regulated by the corresponding intake valve 4. Similarly, the exhaust manifold 5 is connected to the cylinders 2 by means of respective exhaust ducts 10 (only one of which is shown in FIG. 1), each of which is regulated by the corresponding exhaust valve 6. A discharge duct 11 leads from the exhaust manifold 5 and ends in a catalyst (known and mot shown) in order to emit the gases generated by combustion into the atmosphere.

According to a preferred embodiment, the fuel (for instance petrol, diesel, methane, LPG, etc.) is injected into each intake duct 9 by a respective injector 12 disposed in the vicinity of the corresponding intake valve 4. According to a different embodiment (not shown), the injectors 12 are disposed so as directly to inject the fuel into each cylinder 2.

Figure 2:
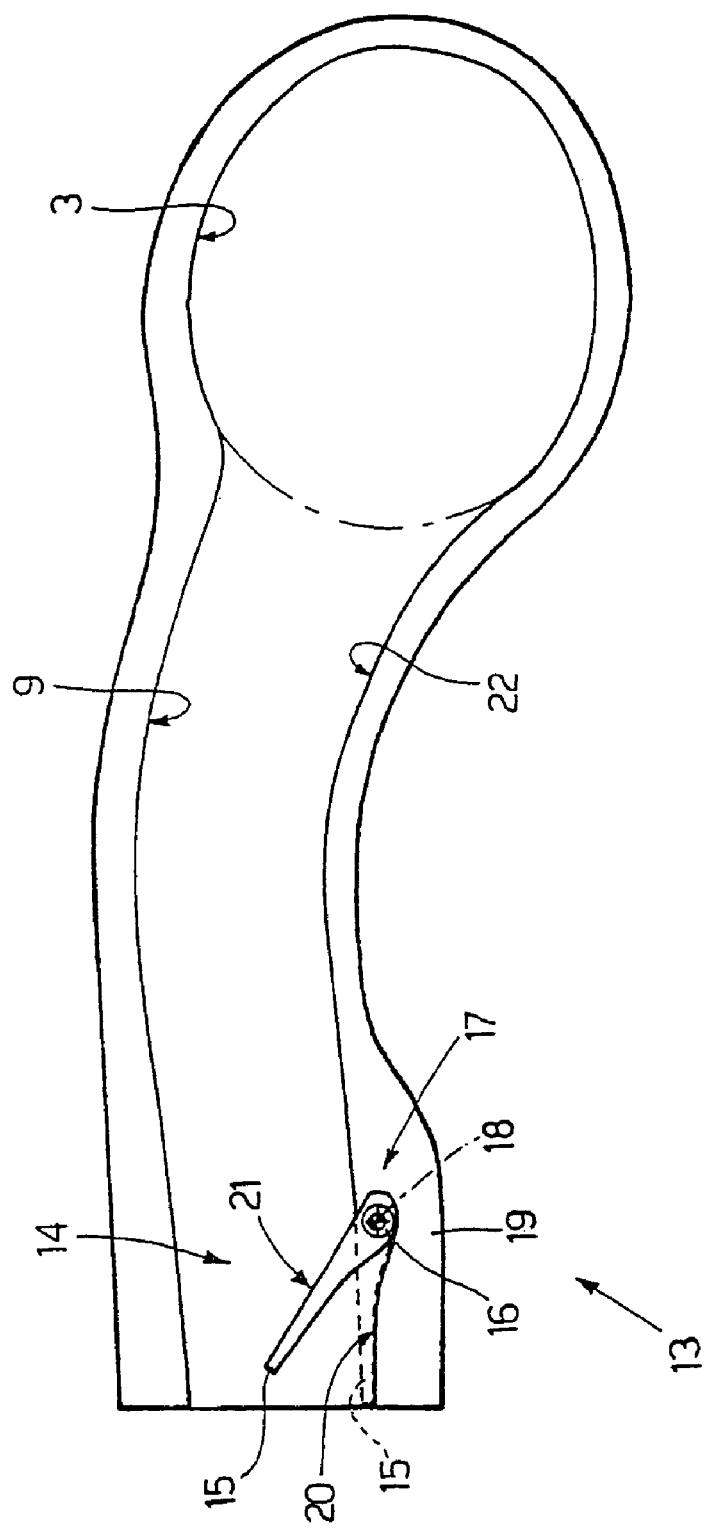
FIG. 2 is a view in lateral section through part of the intake manifold of FIG. 1.

The intake manifold 3 comprises a tumble system 13 which is adapted to vary, during the operation of the engine 1, the section of the intake ducts 9 as a function of the speed of this engine 1. As shown in FIG. 2, the tumble system 13 comprises, for each intake duct 9, a respective choke valve 14 which comprises a butterfly 15 keyed on a shaft 16 in order to rotate under the thrust of an actuator device 17 about an axis 18 disposed transversely and externally with respect to the corresponding intake duct 9.

In operation, each butterfly 15 moves under the thrust of the actuator device 17 between a position of maximum extraction (shown in continuous lines in FIG. 2) in which the butterfly 15 reduces the passage section of the air of the respective intake duct 9 to a minimum, and a rest position (shown in dashed lines in FIG. 2) in which the butterfly 15 substantially does not reduce the passage section of the air of the respective intake duct 9.

For each butterfly 15, the respective shaft 16 is embedded in a wall 19 of the respective intake duct 9 in order to rotate about its respective axis 18 of rotation; moreover, the wall 19 of each intake duct 9 comprises a seat 20 which is adapted to house the respective butterfly 15 when this butterfly 15 is disposed in the rest position. Each butterfly 15 comprises an upper surface 21 which is impacted in use by the flow of air through the respective intake duct 9; when the butterfly 15 is disposed in the rest position, the upper surface 21 of the butterfly 15 forms a continuation of an inner surface 22 of the respective intake duct 9 and is connected substantially in a continuous manner with this inner surface 22.

In operation, the actuator device 17 is adapted to rotate each butterfly 15 about its respective axis 18 between the rest position and the position of maximum extraction; in particular, in the rest position, the upper surface 21 of each butterfly 15 is substantially parallel to the central axis of the respective intake duct 9 while, in the position of maximum extraction, the upper surface 21 of each butterfly 15 forms an angle of approximately 30–45° with respect to the central axis of the intake duct 9.

Figure 3:
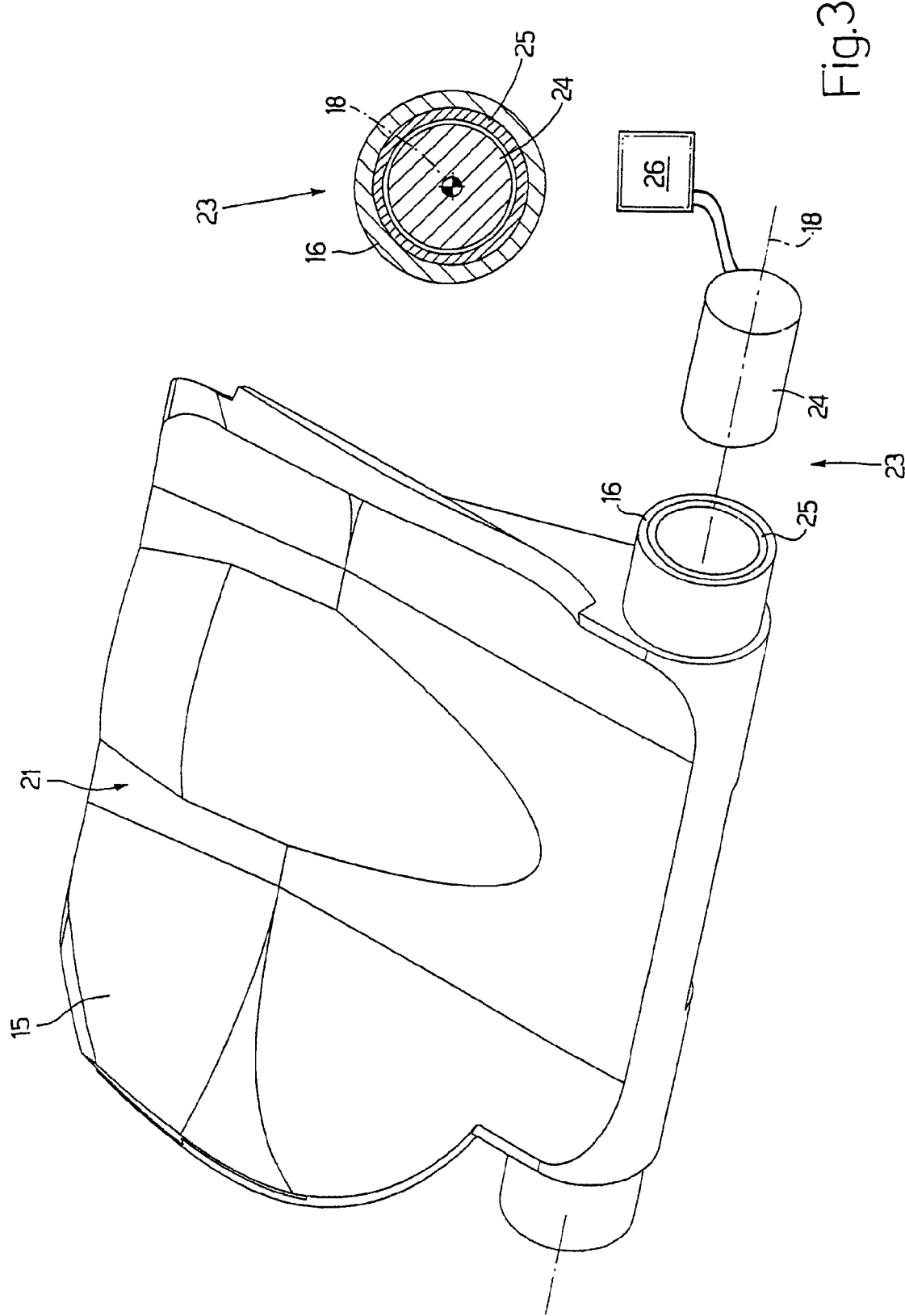
FIG. 3 is a three-dimensional and partly exploded view of a butterfly choke valve of the intake manifold of FIGS. 1 and 2.

As shown in FIG. 3, the actuator device 17 comprises, for each butterfly 15, a respective rotary electric motor 23 which is completely independent from the motors 23 of the other butterflies 15. Each motor 23 comprises a stator 24 which is housed within the shaft 16 of the respective butterfly 15, and a rotor 25 which is rigid with the shaft 16 of the respective butterfly 15 so as to be coupled in use with the stator 24. In other words, each motor 23 is integrated in the shaft 16 of the respective butterfly 15 since the shaft 16 is hollow and internally houses both the stator 24 and the rotor 25 of the motor 23; it will be appreciated that the rotor 25 is rigid with the shaft 16, while the stator 24 is rigid with the wall 19 of the intake duct and is mounted so as to enable the shaft 16 to rotate with respect to the stator 24 about the axis 18.

In order to facilitate the mounting of each butterfly 15 on the respective shaft 16, the stator 24 is disposed internally with respect to the rotor 25, and therefore the stator 24 is shaped as a solid cylindrical body while the rotor 25 is shaped as a tubular cylindrical body comprising a central hole adapted to house the stator 24.

The rotor 25 of each motor 23 is preferably formed by permanent magnets and by a magnetic pack and does not therefore require any type of electrical connection; for this reason, the rotor 25 may be readily coupled to the respective butterfly 15; in contrast, the stator 24 has a winding which is electrically supplied, in use, by a drive device 26 of known type.

Each butterfly 15 is preferably made from moulded plastics material and the respective rotor 25 is jointly moulded with the butterfly 15 when the butterfly 15 is itself being moulded; in this way, each rotor 25 is substantially embedded within the respective butterfly 15.

According to a further embodiment (not shown), each shaft 16 may also be coupled to a respective spring adapted to retain the butterfly 15 in the rest position; in operation, the relative motor 23 displaces the butterfly 15 from the rest position to the position of maximum extraction against the action of the spring.

In the embodiment described above, each butterfly 15 assumes only the rest position and the position of maximum extraction in a stable manner; according to a further embodiment (not shown), each butterfly 15 could also assume intermediate positions between the rest position and the position of maximum extraction in a stable manner.

The above-described constructional solution has many advantages, as it is simple and economic to embody since each cylinder 2 is provided with a single intake duct 9; when the butterflies 15 are disposed in the rest position, these butterflies 15 introduce minimal or even zero losses of load with respect to the suctioned flow of air, thus enabling optimal filling of the cylinders 2 and an increase in the maximum power than can be generated. Moreover, the fact that each motor 23 is integrated in the respective shaft 16 makes it possible to eliminate any part external to the intake ducts 9 with the advantage of a high degree of compactness and a high level of constructional simplicity. Lastly, experimental tests have shown that the actuator device 17 described above has extremely small power requirements and energy consumption as inertia and friction are minimised; in particular, the power requirement of an actuator device 17 described above may, in operation, be 4–6 Watt, in comparison with a power requirement of a conventional actuator device of more than 40 Watt.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A choke valve for an intake manifold with a retracting tumble system for an engine provided with a number of cylinders the choke valve being adapted to vary the passage section of the air through an intake duct which connects a respective cylinder with the intake manifold and is regulated by at least one intake valve, the choke valve comprising:
   a butterfly disposed within the intake duct and mounted on a hollow shaft to rotate under the thrust of an actuator device about an axis of rotation disposed transversely with respect to the intake duct and passing through said shaft; and
   said actuator device including a rotary electric motor having a stator and a rotor, both said stator and said rotor being housed within said shaft of said butterfly.

2. The choke valve as claimed in claim 1, wherein the axis of rotation of the butterfly is disposed substantially externally with respect to the intake duct.

3. The choke valve as claimed in claim 2, wherein the butterfly is movable between a position of maximum extraction, in which the butterfly reduces the passage section of the air of the respective intake duct to a minimum, and a rest position in which the butterfly substantially makes no reduction in the passage section of the air of the intake duct.

4. The choke valve as claimed in claim 3, wherein the intake duct includes a wall bounding the passage section of the air, said shaft being fixed and embedded in the wall of the respective intake duct.

5. The choke valve as claimed in claim 4, wherein the wall of the intake duct includes a seat which is adapted to house the butterfly when this butterfly is disposed in the rest position.

6. The choke valve as claimed in claim 2, wherein the butterfly includes an upper surface which is impacted in use by the flow of air through the respective intake duct, said butterfly upper surface forming part of an inner surface of the respective intake duct when the butterfly is disposed in a rest position in which the butterfly substantially does not reduce the passage section of the air of the respective intake duct.

7. The choke valve as claimed in claim 1, wherein the rotor is embedded within the butterfly.

8. The choke valve as claimed in claim 7, wherein the butterfly is made from moulded plastics material, with the rotor being jointly moulded therewith.

9. The choke valve as claimed in claim 1, wherein the rotor fits within and is rigid with the shaft.

10. The choke valve as claimed in claim 9, wherein the stator is disposed internally within said rotor.

11. A retracting tumble system for an intake manifold of an internal combustion engine provided with a number of cylinders, the intake manifold having, for each cylinder, a respective intake duct which is adapted to connect the intake manifold with the cylinder and is regulated by at least one intake valve, said retracting tumble system, for each intake duct, comprising:

a choke valve disposed within the respective intake duct and adapted to vary the passage section of the air through the intake duct, said choke valve including a butterfly mounted to rotate under the thrust of an actuator device about an axis of rotation disposed transversely with respect to the intake duct;

said actuator device including, for each butterfly, a respective rotary electric motor that is fully independent from the motors of the other butterflies, each of said motors including a stator and a rotor which are both housed within a hollow portion of a shaft in the respective butterfly.

12. The retracting tumble system as claimed in claim 11, wherein said butterfly is mounted on said shaft.

13. The retracting tumble system as claimed in claim 12, wherein the rotor fits within and is rigid with the shaft.

14. The retracting tumble system as claimed in claim 13, wherein the stator is disposed internally within said rotor.

15. An improved choke valve for an intake manifold with a retracting tumble system for an engine provided with a number of cylinders, the choke valve being adapted to vary the passage section of the air through an intake duct which connects a respective cylinder with the intake manifold and is regulated by at least one intake valve, the choke valve being disposed within the intake duct and being provided with a butterfly mounted on a shaft so as to rotate about an axis of rotation disposed transversely with respect to the intake duct, wherein the improvement comprises:

an actuator device providing thrust for rotating said butterfly about said axis, said actuator device including a rotary electric motor having a stator and a rotor which are both housed within said shaft in said butterfly.

16. The improvement as set forth in claim 15, wherein said butterfly is mounted on said shaft such that said axis of rotation is substantially in alignment with a longitudinal axis of said shaft, said shaft having a hollow portion receiving said rotor and stator.

17. The improvement as claimed in claim 16, wherein the rotor fits within and is rigid with said shaft.

18. The improvement as claimed in claim 17, wherein the stator is disposed internally within said rotor.

19. The improvement as claimed in claim 15, wherein each of said cylinders has a respective choke valve having a respective butterfly, each butterfly having a respective rotary electric motor which is fully independent from the motors of the other butterflies and which includes a respective rotor and stator housed therein.

* * * * *